(12) United States Patent
Raybould

(10) Patent No.: US 7,732,368 B2
(45) Date of Patent: Jun. 8, 2010

(54) LOW COST QUICK RESPONSE CATALYST SYSTEM

(75) Inventor: Derek Raybould, Denville, NJ (US)

(73) Assignee: Honeywell International Inc., Morristown, NJ (US)

( * ) Notice: Subject to any disclaimer, the term of this patent is extended or adjusted under 35 U.S.C. 154(b) by 363 days.

(21) Appl. No.: 11/413,855

(22) Filed: Apr. 27, 2006

(65) Prior Publication Data

US 2006/0194697 A1 Aug. 31, 2006

Related U.S. Application Data

(62) Division of application No. 10/410,831, filed on Apr. 9, 2003, now Pat. No. 7,067,454.

(51) Int. Cl.
*B01J 23/00* (2006.01)
(52) U.S. Cl. .................................................. 502/300
(58) Field of Classification Search ................. 422/122; 60/274
See application file for complete search history.

(56) References Cited

U.S. PATENT DOCUMENTS

| | | | |
|---|---|---|---|
| 3,900,429 A * | 8/1975 | Komatsu et al. ............ 502/303 |
| 3,900,602 A | 8/1975 | Rummel | |
| 3,966,645 A * | 6/1976 | Cairns et al. ................. 502/314 |
| 4,207,291 A | 6/1980 | Byrd et al. | |
| 4,665,973 A * | 5/1987 | Limberg et al. ............. 165/133 |
| 5,080,882 A | 1/1992 | Yoshimoto et al. | |
| 5,158,654 A | 10/1992 | Yoshimoto et al. | |
| 5,187,137 A * | 2/1993 | Terui et al. ................... 502/241 |
| 5,422,331 A | 6/1995 | Galligan et al. | |
| 5,620,672 A | 4/1997 | Galligan et al. | |
| 5,939,354 A | 8/1999 | Golden | |
| 5,977,017 A | 11/1999 | Golden | |
| 5,979,157 A * | 11/1999 | Kinugasa et al. .............. 60/274 |
| 6,280,691 B1 * | 8/2001 | Homeyer et al. ............ 422/122 |
| 6,281,159 B1 * | 8/2001 | Fromson et al. ............. 502/324 |
| 6,330,947 B1 | 12/2001 | Scott | |
| 2002/0004455 A1 * | 1/2002 | Nakanishi et al. ........... 502/439 |
| 2002/0068025 A1 * | 6/2002 | Foster et al. ................. 422/179 |

* cited by examiner

*Primary Examiner*—Melvin C Mayes
*Assistant Examiner*—Stefanie Cohen
(74) *Attorney, Agent, or Firm*—Oral Caglar, Esq.

(57) ABSTRACT

A catalyst system for removing one or more components from a fluid stream includes a binder layer and a plurality of catalyst structures affixed to, and protruding from, the binder layer such that the catalyst structure surface is directly exposed to the fluid stream. Methods for preparing a catalyst system, and for selectively removing components from a fluid stream via a catalyst system are also disclosed.

6 Claims, 6 Drawing Sheets

LOW COST QUICK RESPONSE CATALYST SYSTEM

CROSS-REFERENCE TO RELATED APPLICATIONS

This is a divisional application of U.S. application Ser. No. 10/410,831 filed on Apr. 9, 2003, now U.S. Pat. No. 7,067,454, which is hereby incorporated by reference in its entirety.

BACKGROUND OF THE INVENTION

The present invention generally relates to a catalyst system and methods for making a catalyst system. The present invention also relates to apparatus, compositions, and methods for selectively removing one or more components from a fluid stream via a catalyst system.

Many conventional catalyst systems and apparatus have used catalyst materials embedded or impregnated within a support matrix to form a catalyst-matrix mixture. Such mixtures have been applied to various substrates to provide catalyst systems of the prior art. When a fluid stream is passed within, or over, such catalyst-matrix mixtures, the catalytically active materials are protected from the fluid stream by the surrounding matrix, thereby limiting the effectiveness and efficiency of the catalyst in removing components from the fluid stream. Further, such catalyst-matrix mixtures have been applied to a substrate as a paste, which tends to clog the catalyst system, thereby impeding flow of the fluid stream and causing a substantial pressure drop within the system. In addition, many prior art catalyst-matrix mixtures tend to crack and lack continuity on the substrate after the mixture has dried. Furthermore, catalyst-matrix mixtures of the prior art have been deposited as relatively thick layers, such that the mixture substantially decreases the thermal efficiency of heat exchangers of a fluid circulation system.

As can be seen, there is a need for a catalyst system for the passage of a fluid stream therethrough, the catalyst system including at least one catalytically active material, wherein the at least one catalytically active material is directly exposed to the fluid stream as the fluid stream is passed with respect to the catalyst system. There is a further need for a catalyst system which provides for the efficient removal of components from a fluid stream using a relatively small amount of catalytically active material within the system. There is also a need for a catalyst system which provides for the efficient removal of components from a fluid stream while having no substantial effect on heat exchanger efficiency or pressure drop across the system. There is a further need for a catalyst system including a thermally stable binder layer, wherein at least one catalytically active material rapidly reaches light-off temperature due to direct exposure to the fluid stream. There is also a need for a system wherein a catalyst can be applied only to specific local areas of a component where it is needed and can function, rather than having to apply the catalyst to the entire component, even though it is known that most of the applied catalyst will not be used. The present invention provides such systems using low cost materials and manufacturing processes, as will be described in enabling detail hereinbelow.

SUMMARY OF THE INVENTION

In one aspect of the present invention, a catalyst system including a catalytic laminate for passage of a fluid stream thereover comprises a binder layer; and a plurality of catalyst structures disposed on the binder layer, wherein the plurality of catalyst structures protrude from a surface of the binder layer such that the plurality of catalyst structures are directly exposed to the fluid stream when the fluid stream is passed over the catalytic laminate.

In another aspect of the present invention, there is provided a method of preparing a catalyst system including a catalytic laminate for removal of one or more components from a fluid stream, wherein the method comprises: coating a substrate with a binder layer; depositing a plurality of catalyst structures on the binder layer; binding the plurality of catalyst structures to the binder layer, wherein the plurality of catalyst structures protrudes from the binder layer such that at least about 70% of the total surface area of the plurality of catalyst structures is directly exposed to the fluid stream when the fluid stream is passed over the catalytic laminate.

In another aspect of the present invention, a method for removing one or more components from a fluid stream comprises providing a catalyst system, the catalyst system having a binder layer and a plurality of catalyst structures affixed to, and protruding from, a surface of the binder layer such that at least about 50% of the total surface area of the plurality of catalyst structures is exposed to the fluid stream; passing the fluid stream over the catalyst system such that the plurality of catalyst structures are directly exposed to the one or more components; and, via the plurality of catalyst structures, removing the one or more components from the fluid stream as the fluid stream passes over the catalyst system.

In another aspect of the present invention, an exhaust system for an internal combustion engine comprises an exhaust gas conduit in communication with the engine, the exhaust gas conduit for passing a stream of exhaust gases from the engine; and a catalyst system in communication with the exhaust gas conduit, the catalyst system including a binder layer and a plurality of catalyst structures protruding from the binder layer, such that the plurality of catalyst structures are directly exposed to the stream of exhaust gases when the stream of exhaust gases passes over the catalyst system.

In another aspect of the present invention, an air purification system for an interior space comprises a source of an airstream; a catalyst system in communication with the airstream, the catalyst system comprising a catalytic laminate including a binder layer and a plurality of catalyst structures disposed on the binder layer, wherein the plurality of catalyst structures protrude from the binder layer such that at least about 70% of the total surface area of the plurality of catalyst structures is directly exposed to the airstream when the airstream is passed over the catalytic laminate.

These and other features, aspects and advantages of the present invention will become better understood with reference to the following drawings, description and claims.

DETAILED DESCRIPTION OF THE INVENTION

Figure 1:
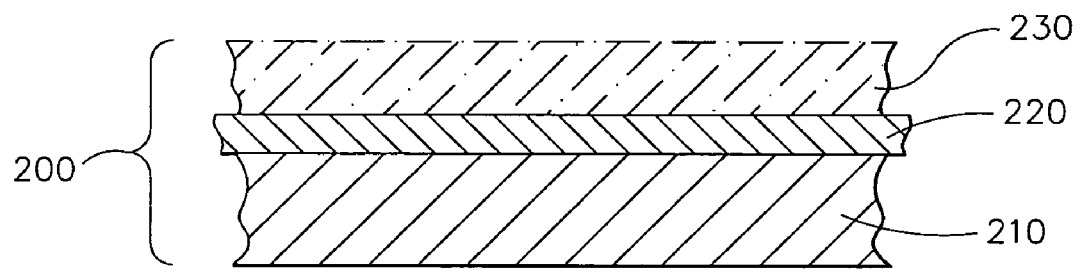
FIG. 1 shows a cross-section of a catalytic laminate of a catalyst system, schematically representing a catalytic layer of the catalyst system, according to one embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides apparatus, compositions, and methods for the catalytic removal of one or more components from a fluid stream, such as a stream of gaseous material. As an example, the present invention may be used for removal of contaminants from an airstream of an air circulation, or environmental control, system for providing a supply of conditioned air to an interior space of a building or an interior of a vehicle. Thus, a catalyst system of the invention may be used for the removal of ozone, hydrocarbons, etc., from air to be circulated to an aircraft cabin or cockpit. As another example, the present invention may find application in the removal of one or more components from an exhaust gas stream of an internal combustion engine. It is to be understood that the above are merely examples, and the invention is by no means limited to these applications.

According to one embodiment, a catalyst system of the invention may comprise a catalytic laminate having a plurality of catalyst structures affixed to, and protruding from, a binder layer, wherein the catalyst structures are directly exposed to a fluid stream as the fluid stream is passed with respect to the catalyst system. Due to the direct exposure of the catalyst structures to the fluid stream, the selective removal of components from the fluid stream is more efficient, as compared with prior art catalyst systems that have catalytic material embedded or impregnated within a paste, matrix, or other supporting material. Greater efficiency of catalyst systems of the invention allow the use of lesser quantities of catalytically active material, thereby decreasing production costs. Furthermore, in catalyst systems of the invention the catalyst structures may be selectively located only at zones of the system which have optimum operating temperatures for catalytic activity, thereby further reducing production costs.

The binder layer of the invention may be a thin, substantially uniform layer of a low thermal conductivity material. The direct exposure of the catalyst structures of the invention to the fluid stream, in concert with the low thermal conductivity of the binder layer, allows catalyst systems of the invention to quickly attain operating (e.g., light-off) temperature, thereby greatly reducing emissions at start up. Unlike many prior art catalyst systems, the binder layer of the invention does not cause a substantial pressure drop across the system. In addition, the binder layer of the invention may be made sufficiently thin so as to cause substantially no decrease in thermal efficiency of a heat exchanger coated with the binder layer. Furthermore, the binder layer of the invention may be tightly bound to a metal substrate to form a protective coating which prevents oxidation of the metal.

With reference to the drawings, FIG. 1 is a cross-section of a portion of a catalytic laminate 200 of a catalyst system, according to one embodiment of the invention. As shown, catalytic laminate 200 includes a substrate 210, a binder layer 220 disposed on substrate 210, and a catalytic layer 230 disposed on binder layer 220. As an example, substrate 210 may be a ceramic or a metal. Substrate 210 may be substantially planar, or may be formed to provide various configurations. In some embodiments, substrate 210 may be configured prior to application of binder layer 220 thereto.

Binder layer 220 may be applied to substrate 210 as a solution to provide, initially, a liquid film which may be subsequently dried and cured to form a solid coating. As an example, binder layer 220 may be a ceramic coating comprising a material such as zirconia, alumina, silica, or titania. Such ceramic coatings may be prepared from a liquid film precursor comprising an alkoxide of zirconium, aluminum, silicon, or titanium.

Catalytic layer 230 may comprise a plurality of catalyst structures (e.g., FIGS. 2-4A). Each catalyst structure may be a solid particle, or a filament, or the like, of a catalytically active material. The plurality of catalyst structures may be applied to binder layer 220 before binder layer 220 has cured, such that the catalyst structures protrude from the surface of binder layer 220. Typically, at least about 50% to 95% of the total surface area of the catalyst structures protrudes from the surface of binder layer 220, preferably at least about 60% to 95%, and more preferably at least about 70% to 95%. Firing of catalytic laminate 200 causes binder layer 220 to strongly bind to substrate 210, and further causes the catalyst structures (e.g., FIG. 2) to be firmly bonded to binder layer 220. Methods for preparing catalytic laminates of the invention will be described in enabling detail hereinbelow (e.g., with reference to FIG. 5).

Figure 2:
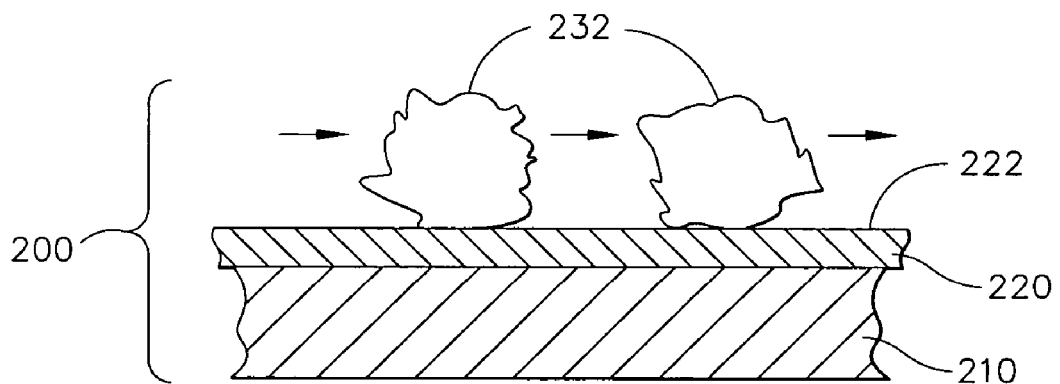
FIG. 2 shows a cross-section of a catalytic laminate of a catalyst system, schematically representing a plurality of catalyst structures of the catalyst system, according to the invention.

FIG. 2 is a cross-section of a catalytic laminate 200 schematically representing a plurality of catalyst structures 232 of a catalyst system. Each of catalyst structures 232 is affixed to binder layer 220, and protrudes from binder layer surface 222. Accordingly, catalyst structures 232 are directly exposed to a fluid stream, represented by solid arrows in FIG. 2, to be treated by the catalyst system. As an example, catalytic laminate 200 may line an inner surface of airsteam ducting, a heat exchanger, etc. of an air purification system for an interior space of a vehicle or building. As another example, catalytic laminate 200 may be located within an exhaust system of an internal combustion engine, e.g., within an exhaust manifold and/or within a catalytic unit downstream from the exhaust manifold. The size, shape, and composition of catalyst structures 232 is, at least to some extent, a matter of design choice.

Catalyst structures 232 may have a diameter in the range of from about 5μ to 200μ, preferably from about 5μ to 100μ, and more preferably from about 10μ to 50μ. As shown in FIG. 2, catalyst structures 232 may have roughened or pitted surface to increase the surface area, and hence to provide increased exposure of catalyst structures 232 to the fluid stream to be treated. Although, catalyst structures 232 are shown in FIG. 2 as being substantially spherical, other shapes are also contemplated under the invention. For example, according to various embodiments, catalyst structures 232 may be in the form of fibers, filaments, hollow tubes, and the like (see, e.g., FIG. 4A). Binder layer 220 may be a substantially uniform layer, having a fairly smooth binder layer surface 222, and a thickness in the range of from about 0.2μ to 100μ, preferably from about 0.5μ to 10μ, and more preferably from about 0.5μ to 5μ. Binder layer 220 may be impermeable, or essentially impermeable, to the fluid stream. That is to say, binder layer 220 does not generally permit the passage therethrough of the fluid comprising the fluid stream.

Figure 3A:
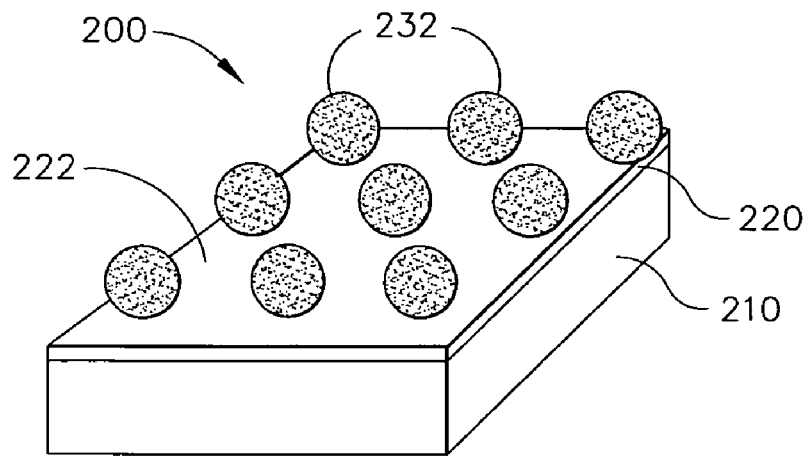
FIG. 3A is a perspective view.
Figure 3B:
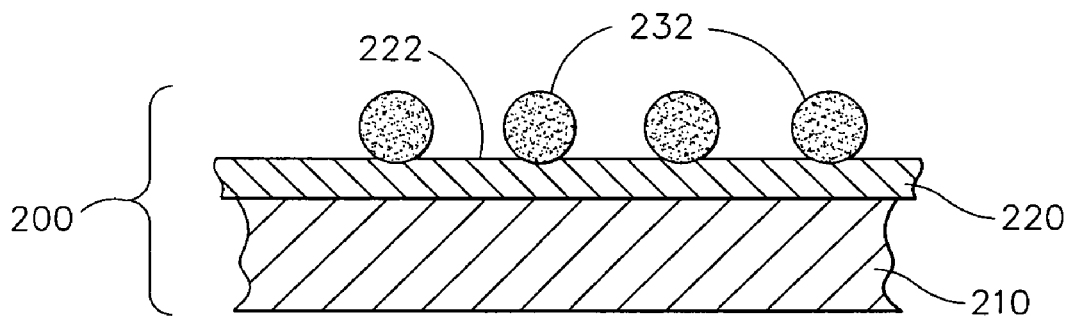
FIG. 3B is a side view, of a portion of a catalytic laminate having a single layer of catalyst structures affixed to, and protruding from, a binder layer, according to one embodiment of the invention.

FIG. 3A is a perspective view, and FIG. 3B is a side view, of a portion of a catalytic laminate 200 showing the arrangement of catalyst structures 232 as a single layer protruding from binder layer surface 222, according to one embodiment of the invention. In FIGS. 3A-B catalyst structures 232 are schematically represented as spheres, it being understood that such structures may have various configurations and surface textures. The concentration, or number, of catalyst structures 232 per unit area of binder layer 220 may vary, e.g., depending on factors such as the volume or surface area of each catalyst structure 232, the nature of the catalytic material comprising catalyst structures 232, the intended use of the catalyst system, etc. In the case of particulate catalyst structures 232 having a diameter in the range of from about 5μ to 100μ, catalytic laminate 200 may comprise from about 50 to 40,000 structures per $mm^2$ of binder layer 220, preferably from about 100 to 15,000 structures per $mm^2$, and more preferably from about 400 to 10,000 structures per $mm^2$. In some embodiments, catalyst structures 232 may be arranged on binder layer 220 as a substantially uniform single layer with adjacent catalyst structures 232 spaced apart from each other on binder layer 220. In other embodiments, catalyst structures 232 may be contiguous with each other, or almost contiguous with each other.

Figure 3C:
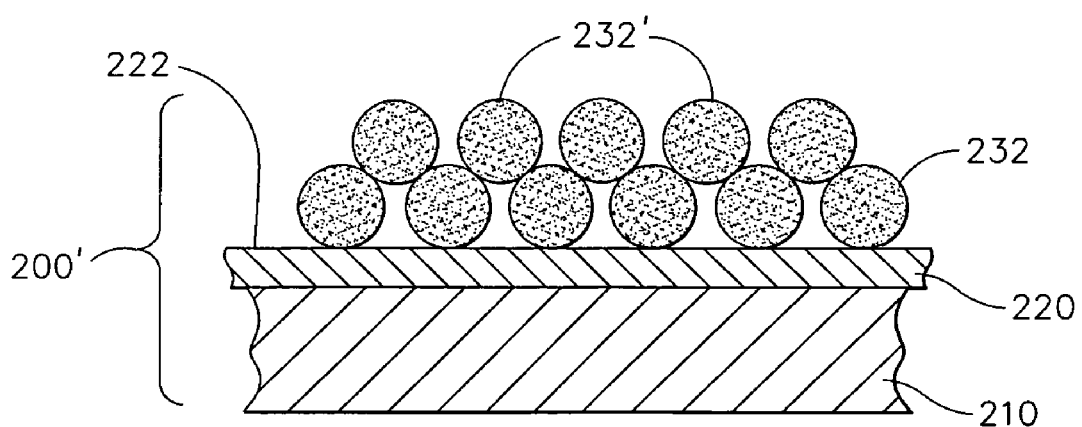
FIG. 3C is a side view of a portion of a catalytic laminate having more than one layer of catalyst structures disposed on a binder layer, according to another embodiment of the invention.

FIG. 3C is a side view of a portion of a catalytic laminate 200', having a second layer of catalyst structures 232' disposed on a first layer of catalyst structures 232, according to another embodiment of the invention. Catalyst structures 232 may be affixed to binder layer 220 (e.g., as described hereinabove with reference to FIGS. 2, 3A-B). While not being bound by theory, applicant believes that catalyst structures 232' may be bonded to a liquid precursor of binder material drawn onto portions of catalyst structures 232 prior to solidification of binder layer 220. Catalyst structures 232' may also be bonded or sintered to portions of catalyst structures 232 during firing of laminate 200'.

Catalyst structures 232' may be quantitatively and qualitatively the same as, or similar to, catalyst structures 232. Alternatively, catalyst structures 232' may be dissimilar to catalyst structures 232 with respect to their dimensions, configuration, chemical composition, catalytic activity, etc. In this manner, a multifunctional catalyst unit can be prepared within a single zone of a catalyst system. In other embodiments of the invention (see, e.g., FIGS. 4A-B), a plurality of different catalytic materials may be restricted to certain zones of a catalyst system. Although, catalyst structures 232', 232 are shown in FIGS. 3A-C as being substantially spherical, it is to be understood that the invention is by no means limited to substantially spherical catalyst structures.

Figure 4A:
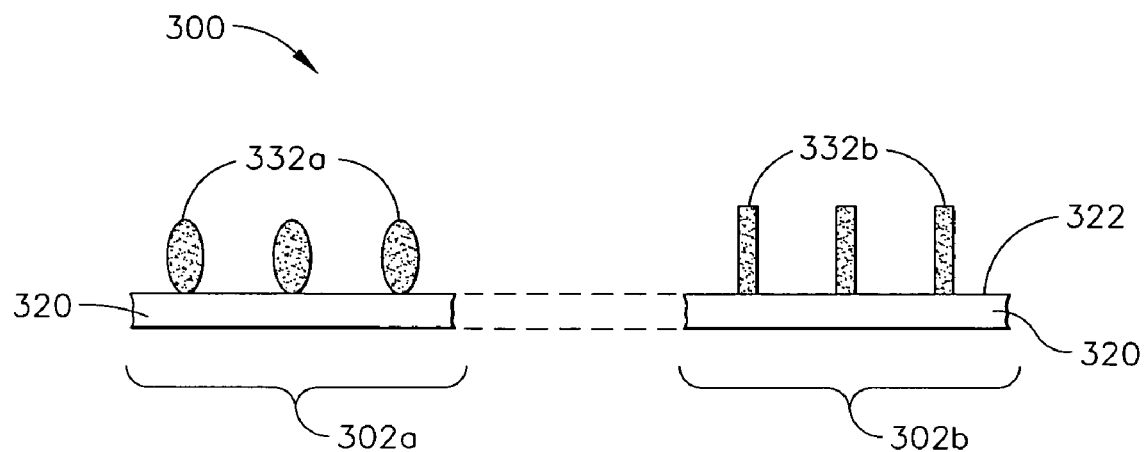
FIG. 4A is a side view.
Figure 4B:
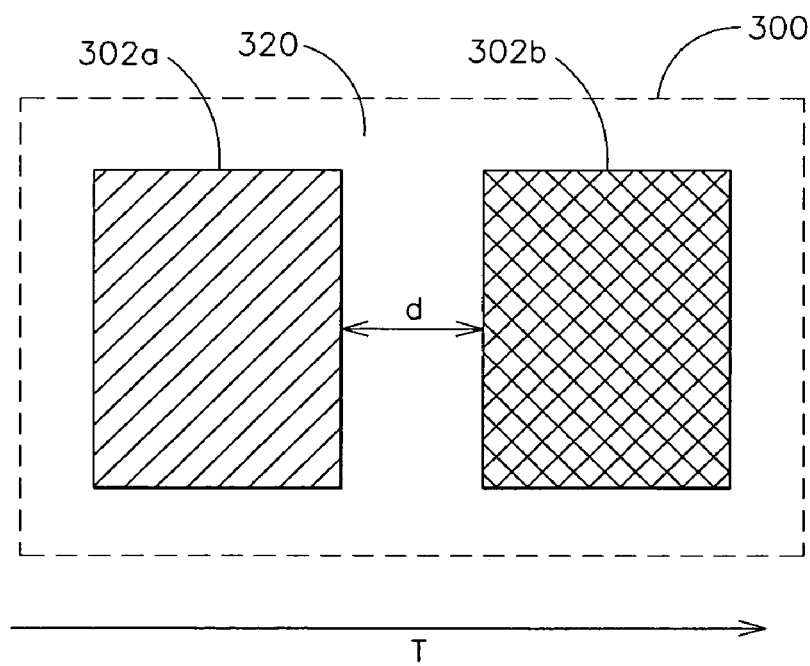
FIG. 4B is a plan view, of a portion of a catalytic laminate for a catalyst system having a plurality of different catalyst structures located within a corresponding plurality of zones of the catalyst system, according to another embodiment of the invention.

FIG. 4A is a side view schematically representing a portion of a catalyst system 300 having a plurality of different catalyst structures located within different zones of the catalyst system, according to another embodiment of the invention. FIG. 4B is a macroscopic plan view schematically representing a portion of catalyst system 300. Catalyst system 300 includes first and second catalytic zones 302a, 302b, wherein each zone comprises a different catalytic laminate composition. First catalytic zone 302a comprises a plurality of first catalyst structures 332a affixed to, and protruding from, a binder layer surface 322 of a binder layer 320. Similarly, second catalytic zone 302b comprises a plurality of second catalyst structures 332b affixed to, and protruding from, binder layer surface 322 of binder layer 320. First and second catalytic zones 302a, 302b may be separated by a distance, d within a catalytic unit or system (as shown). Alternatively, first and second zones 302a, 302b may be contiguous. The catalytic unit may exhibit an operating temperature gradient (represented in FIG. 4B by arrow T), such that first and second catalyst structures 332a, 332b are respectively located within an optimal working temperature range consistent with maximum efficiency of each catalytic zone, 302a, 302b. Although, two catalytic zones 302a, 302b are shown in FIGS. 4A-B, other numbers of zones are also possible under the invention.

Figure 5:
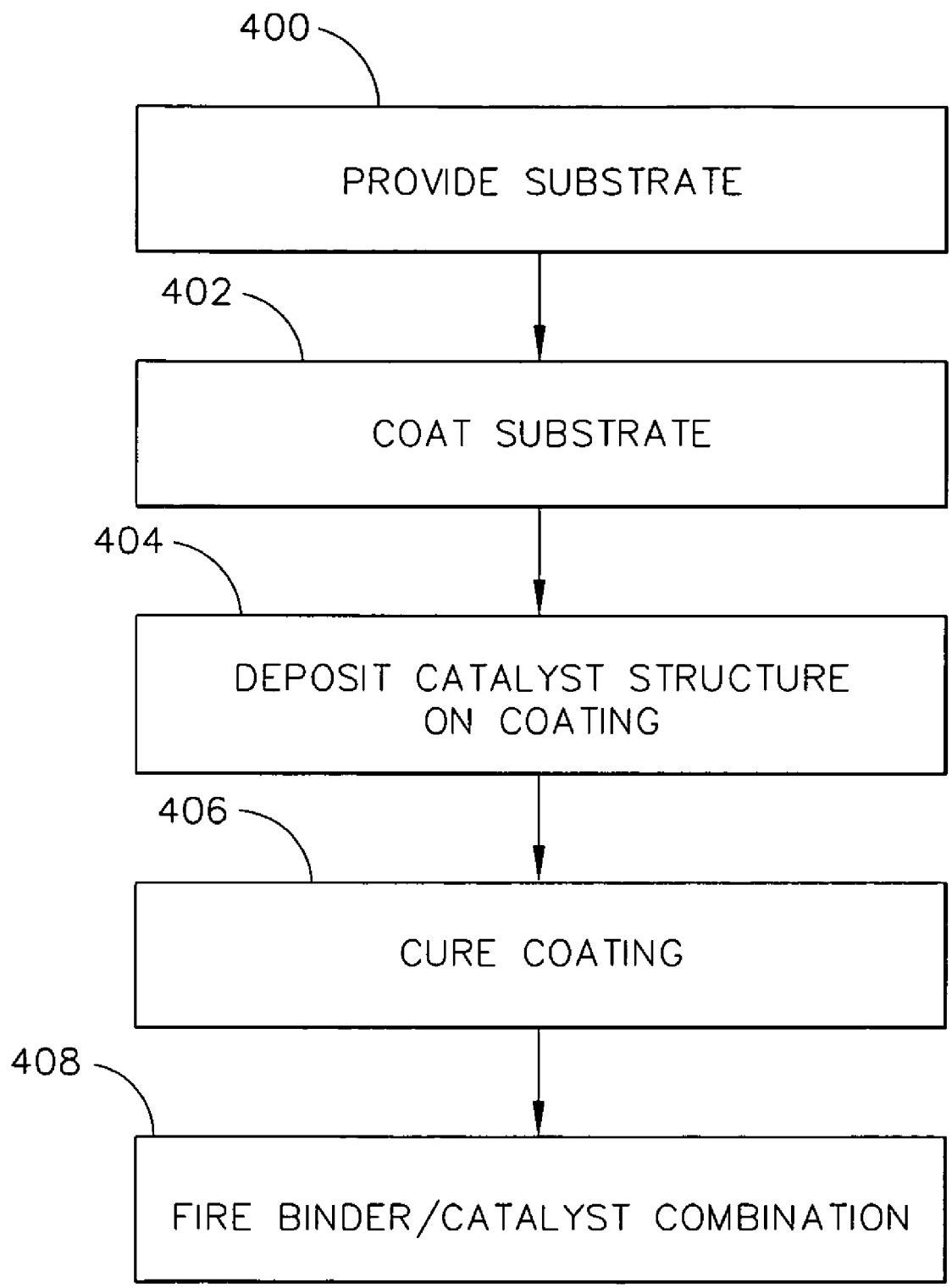
FIG. 5 schematically represents a series of steps involved in a method for preparing a catalytic laminate for a catalyst system, according to another embodiment of the invention.

FIG. 5 schematically represents a series of steps involved in a method for preparing a catalytic laminate for a catalyst system, according to another embodiment of the invention. Step 400 involves providing a substrate. The substrate may be, for example, a ceramic or a metal. A metal substrate may comprise, for example, stainless steel, aluminum, tin, molybdenum, platinum, tungsten, titanium, or their alloys, and the like. The substrate may be formed or shaped to provide various configurations according to the intended application of the catalytic laminate or catalyst system.

Step 402 involves coating the substrate with a binder layer adapted, inter alia, for accepting, and affixing thereto, a plurality of catalyst structures. In one embodiment, coating the substrate involves forming a film of a solution on the substrate, and subsequently curing the film to form a solid coating. In one embodiment, such a film comprises a solution of an alkoxide of silicon, titanium, aluminum, or zirconium, or mixtures thereof, in a suitable organic solvent. Exemplary alkoxides include zirconium butoxide and aluminum butoxide. Exemplary solvents include ethanol and toluene. Such solutions may comprise from about 5% to 95% solvent, usually from about 10% to 90% solvent, and typically from about 30% to 70% solvent, by weight/volume.

The composition and concentration of the solution may be varied to carefully control the viscosity of the solution. While not being bound by theory, applicant has observed that the viscosity of the solution may be critical in permitting appropriate coverage of the substrate with a thin, uniform layer or film of the solution. Thus, the viscosity of the solution may be critical in determining the thickness of the film formed on the substrate, and accordingly in determining the thickness of the binder layer. Solutions having relatively high viscosity tend to form relatively thick, uneven layers on a substrate, leading to problems encountered in the prior art, such as clogging of channels within heat exchangers and similar components, as well as substantial pressure drop across such components, and decreased thermal efficiency of heat exchangers. Therefore, according to the invention, the solution with which the substrate is coated may have a viscosity typically less than about 200 centipoise, preferably from about 0.5 to 100 centipoise, and more preferably from about 0.5 to 50 centipoise.

In one embodiment of the invention, the substrate may be coated by a solution comprising an incipient or precursor binder layer, by dip coating the substrate to provide a film of the solution on the surface(s) of the substrate. The thickness of such a film may be controlled by varying the speed of removal of the substrate from the solution, as well as by adjusting the viscosity of the solution. In one embodiment, the thickness of the coating or binder layer may be controlled by multiple dip coating of the substrate. In the latter situation, the film may be dried, cured or fired between dips. Step 402 may involve coating the entire surface of the substrate with the binder layer. Alternatively, the binder layer may be selectively applied to certain portions of the substrate, e.g., using a mask, or the like.

Step 404 involves depositing a plurality of catalyst structures on the binder layer or coating. Typically, the catalyst structures are deposited on the coating while the film (i.e., incipient binder layer) provided in step 402 is still wet. The catalyst structures deposited on the coating may be particulate catalytically active materials, e.g., in the form of a powder. The catalyst structures may be substantially spherical, or may have elongated, e.g., ovoid, filamentous, or tubular structures. In the case of substantially spherical catalyst structures, each particle may have a rough, pitted or irregular surface so as to increase the surface area of the catalyst structure that can be exposed to a fluid stream, thereby increasing the efficiency of the catalyst system. In the case of elongate filamentous or tubular catalyst structures, the structures may be oriented with respect to the binder layer to promote exposure to the fluid stream to be treated.

Step 404 may involve depositing the catalyst structures on the coating or binder layer by gravitational deposition, or by propelling the catalyst structures against the binder layer surface. Techniques for depositing solid particles on a surface are known in the art.

Each of the plurality of catalyst structures deposited according to step 404 may comprise a catalytically active material. As an example, the catalyst structures may comprise a precious metal catalyst, a metal oxide catalyst, or a perovskite-type oxide catalyst. Such metal and metal oxide catalysts are well known in the art. Exemplary precious metal catalysts include: platinum, palladium, gold, silver, and ruthenium. Exemplary metal oxide catalysts include: antimony oxide, magnesium oxide, oxides of iron (e.g., iron(III) oxide), cerium (e.g., cerium(IV) oxide), niobia, vanadia, a mixed metal oxide, or a combination of the above. As an example only, perovskite-type catalysts are described in U.S. Pat. Nos. 5,977,017 and 5,939,354, the disclosures of which are incorporated by reference herein in their entirety.

Step 404 typically involves depositing the catalyst structures on the binder layer in such a manner that the catalyst structures protrude from a surface of the binder layer. Protrusion of catalyst structures from the binder layer is associated with a number of advantages exhibited by catalyst systems of the invention, as described hereinabove. For example, protrusion of catalyst structures from the binder layer allows direct exposure of a fluid stream to the catalytically active material, thereby greatly increasing efficiency of the catalyst system, and/or decreasing the required amount of catalyst material, as compared with many prior art systems. Direct exposure to the fluid stream also promotes more rapid attainment of light-off temperature of the catalyst structures, as compared with prior art systems in which catalytically active material is isolated and insulated from the fluid stream by a supporting matrix.

Step 406 involves curing the coating or film of solution applied to the substrate in step 402. In embodiments in which the solution comprises an alkoxide of zirconium, silicon, titanium, or aluminum, step 406 comprises reacting the coating with water vapor in a controlled atmosphere such that solvent is removed, and the film is transformed to a solid ceramic layer in which oxide particles are polymerized or cross-linked. Typically, the relative humidity of the controlled atmosphere is in the range of from about 0 (zero) % to 90%, often in the range of from about 10% to 90%, and usually in the range of from about 20% to 80%.

Curing of the binder layer according to the invention may take from a few seconds to about 24 hours, usually from about 1 minute to 12 hours, and more typically from about 5 minutes to 4 hours. Factors determining the rate of curing of the binder layer include the composition of the coating solution, as well as the humidity and temperature of the atmosphere, and the rate of air flow over the coating. The curing stage may be performed at a temperature typically in the range of from about 15° C. to 500° C., preferably from about 100° C. to 400° C., and more preferably at a temperature greater than 100° C. to about 400° C. The rate of curing of the binder layer may be controlled by manipulating the composition of the solution, the temperature, and relative humidity, in order to facilitate deposition of the catalyst structures (step 404) before curing is complete. For example, the relative humidity may initially be kept fairly low, e.g., in the range of from about 20% to 40%, in order to delay curing of the binder layer until after the catalyst structures have been deposited thereon. Thereafter, the relative humidity may be increased, e.g., to a value in the range of from about 40% to 80%, to accelerate curing of the binder layer.

Step 408 involves firing the substrate/binder layer/catalyst structure combination to form a catalytic laminate of the invention. Typically, firing may be performed at a temperature in the range of from about 300° F. to 1200° F., and more typically from about 500° F. to 1000° F., and for a period in the range of from about 10 to 100 minutes, usually from about 15 to 90 minutes, and more typically from about 15 to 60 minutes.

During the firing stage, the binder layer undergoes densification and is bound strongly to the substrate. Firing also serves to sinter the catalyst structures to the binder layer to provide a catalytic layer in which the catalyst structures are firmly affixed to the binder layer, and at the same time the catalyst structures protrude from the binder layer. Typically, at least about 50% to 95% of the total surface area of the catalyst structures protrudes from the surface of the binder layer, preferably at least about 60% to 95%, and more preferably at least about 70% to 95%. In some embodiments, firing can be performed rapidly by placement in a pre-heated furnace, holding the temperature for the desired time period, and immediately thereafter removal to ambient conditions, i.e., no temperature ramp up/ramp down is required. A catalytic laminate prepared according to the invention has a binder layer which may withstand thermal cycling to a temperature of 1300° F. for at least 4,000 cycles.

Figure 6:
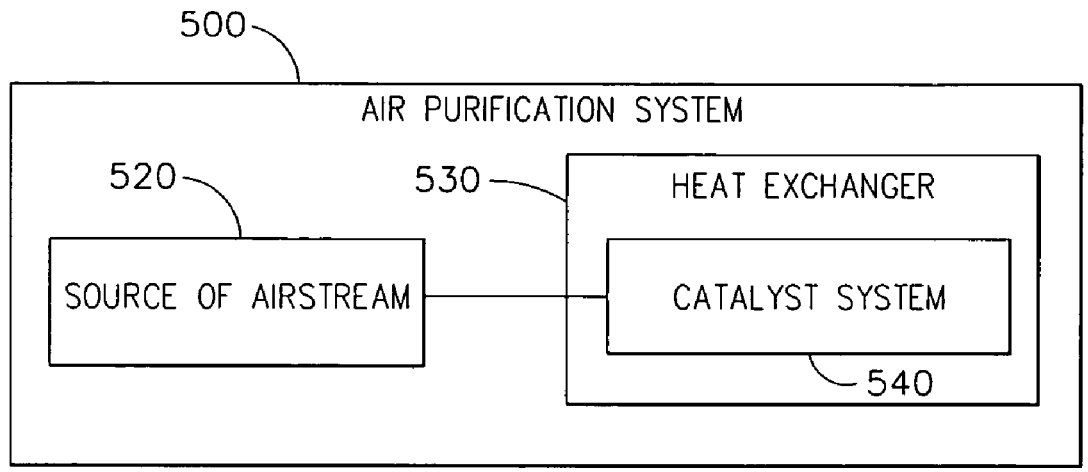
FIG. 6 is a block diagram schematically representing an air purification system incorporating a catalyst system, according to another embodiment of the invention.

With reference to FIG. 6, there is shown a block diagram schematically representing an air purification or air circulation system, according to one aspect of the instant invention. Air purification system 500 may include a source of an airstream 520 which may be in communication with a heat exchanger 530 and a catalyst system 540. Catalyst system 540 is capable of efficiently removing one or more components from a stream of air emanating from source of airstream 520. Such components may include various contaminants or pollutants, such as volatile organic compounds (VOCs), $NO_x$, CO, $O_3$, and the like. Catalyst system 540 may include a catalytic laminate, wherein the catalytic laminate has a plurality of catalyst structures affixed to, and protruding from, a relatively thin binder layer. The plurality of catalyst structures may comprise one or more catalytically active materials, as described hereinabove. Catalytic laminates of catalyst system 540 may have various elements, features, and characteristics as described herein for various embodiments of the invention (e.g., with reference to FIGS. 1-5).

Figure 7:
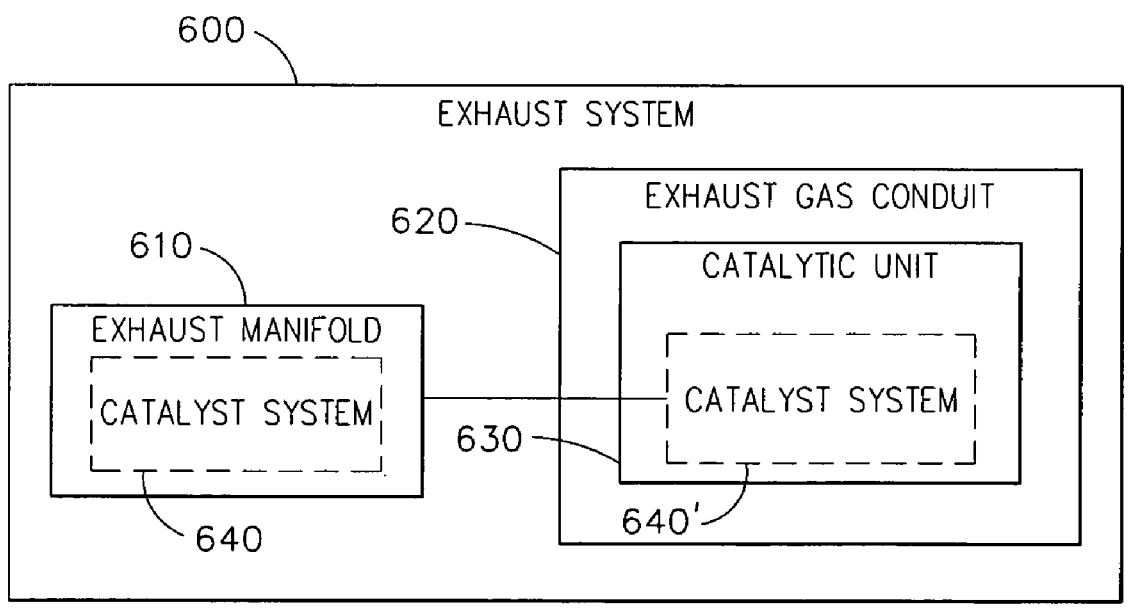
FIG. 7 is a block diagram schematically representing an exhaust system incorporating a catalyst system, according to another embodiment of the invention.

FIG. 7 is a block diagram schematically representing an exhaust system 600, according to another embodiment of the invention. As an example, exhaust system 600 may be used in conjunction with an internal combustion engine, e.g., an engine of a wheeled vehicle. Exhaust system 600 may include an exhaust manifold 610 for receiving a stream of exhaust gases from the engine. Exhaust manifold 610 may be in communication with an exhaust gas conduit 620 for passage of the stream of exhaust gases therethrough. Exhaust system 600 may include a catalyst system 640, which may be housed within exhaust manifold 610. Exhaust system 600 may alternatively, or additionally, include a second catalyst system 640'. Second catalyst system 640' may be housed within exhaust gas conduit 620. Exhaust system 600 may further include a catalytic unit or converter 630, and second catalyst system 640' may be housed within catalytic unit 630. Catalyst systems 640, 640' are capable of efficiently removing one or more components from an exhaust gas stream of an internal combustion engine. Such components may include various pollutants, such as $NO_x$, CO, VOC's, hydrocarbons, and the like.

Each of catalyst systems 640, 640' may include a catalytic laminate having a plurality of catalytically active solid structures protruding from the surface of a binder layer. In this manner, the catalytically active solid structures are directly exposed to the exhaust gas stream, thereby not only increasing efficiency of pollutant removal per unit of catalytically active material, but also decreasing the time required to achieve light-off temperature. As a result, emissions at start up are greatly reduced. A catalytic laminate of the invention may be selectively applied to key areas of exhaust manifold 610, e.g., at key areas next to the engine. Locating the catalytic laminate very close to the engine significantly decreases the time to achieve "light-off". The catalytic laminate may also be applied locally to key parts of exhaust gas conduit 620. Since the catalytic laminate applied to exhaust gas conduit 620 will see lower temperatures, the catalytically active material applied to exhaust gas conduit 620 may be different from that applied to exhaust manifold 610. Embodiments of catalyst laminates suitable for use in conjunction with catalyst system 600 are described hereinabove, for example, with respect to FIGS. 1-5.

Figure 8:
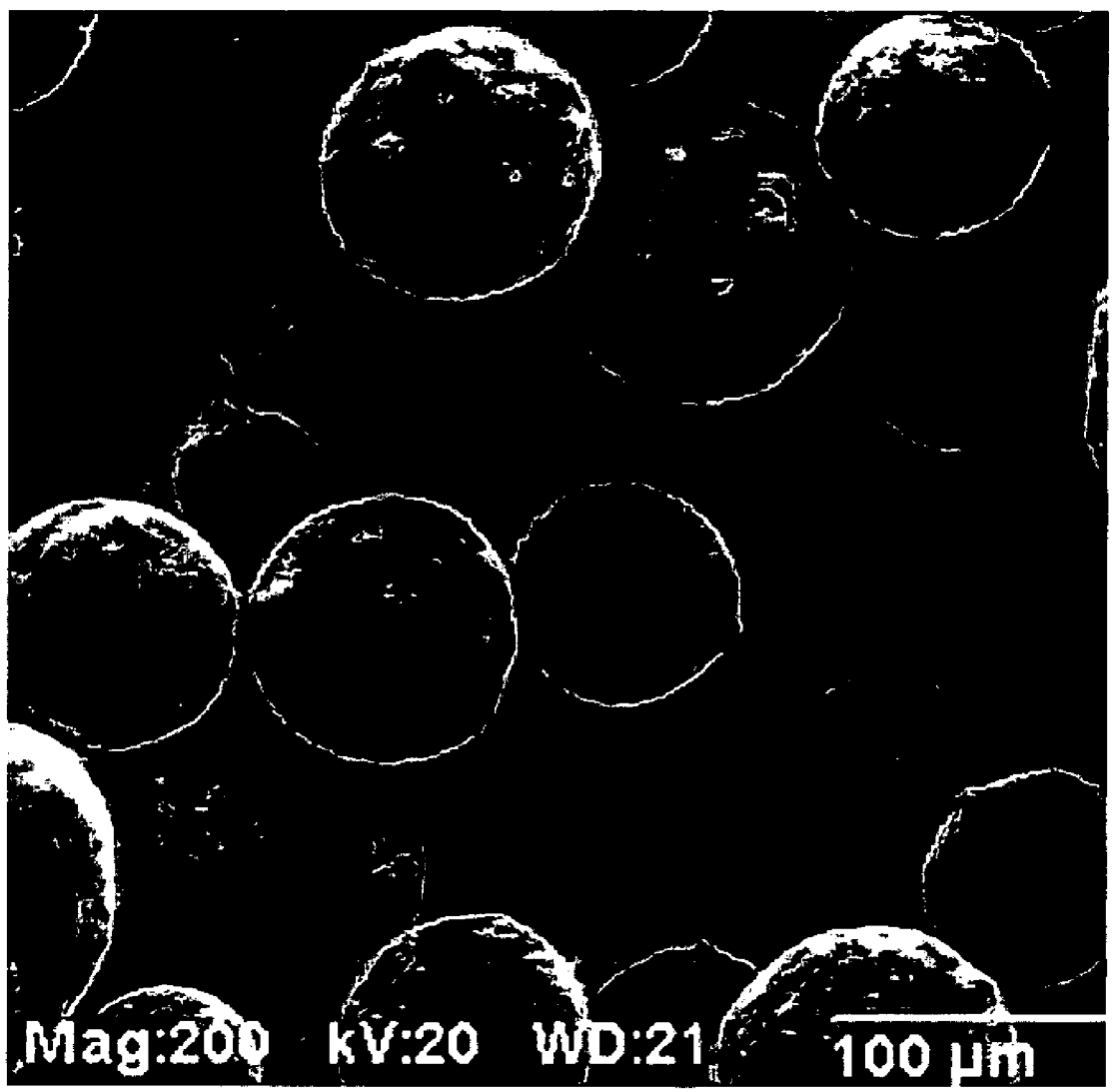
FIG. 8 is a scanning electron micrograph showing metal particles bonded to, and protruding from, the surface of a binder layer, according to one aspect of the invention.

FIG. 8 is a scanning electron micrograph (SEM) of metal particles (copper powder) bonded to a zirconia coating, clearly showing protrusion of the particles from the surface of the binder layer. The zirconia coating/binder layer was prepared, and the copper powder deposited thereon, generally as described with reference to FIG. 5. Smooth particles of solid copper were used to demonstrate the effectiveness of the invention in affixing micro-particulate structures to the surface of a binder layer or coating. Following deposition of the particles on the coating, the binder layer was cured and fired as described hereinabove. Even at relatively high concentrations of powder per unit area of binder layer, the smooth copper particles were firmly attached to the binder layer (Example 2).

EXAMPLE 1

A metal substrate was coated with a zirconia binder layer, and the binder layer bonded to the substrate, generally according to the method described hereinabove with reference to FIG. 5. After thermal cycling of the substrate/binder layer combination to a temperature of 1300° F. every 30 minutes for 4,000 hours, the binder layer exhibited no signs of flaking. Furthermore, microscopic examination of the binder layer showed no change in the appearance of the binder layer after the above thermal cycling regime.

EXAMPLE 2

A substrate comprising a stainless steel plate was coated with a zirconia binder layer, generally according to the method described hereinabove with reference to FIG. 5. Prior to curing the binder layer, copper powder comprising substantially spherical, smooth particles having a diameter in the range of from about 20μ to 150μ was deposited on the binder layer. After firing the substrate/binder/powder combination, the copper powder was found to be firmly attached to the binder layer. Scanning electron micrographs (SEM, at a magnification of 200×) showed the particles of copper as protruding from the binder layer surface having at least about 90% of their surface areas exposed (FIG. 8). Energy dispersive X-ray (EDX) analysis of the surface of the copper particles found them to be free from traces of zirconia, the binder layer, thereby confirming that the particles would be directly exposed to fluid flow.

It should be understood, of course, that the foregoing relates to preferred embodiments of the invention and that modifications may be made without departing from the spirit and scope of the invention as set forth in the following claims.

I claim:

1. An exhaust system for an internal combustion engine, comprising:
   an exhaust gas conduit in communication with said engine, said exhaust gas conduit for passing a stream of exhaust gases from said engine; and
   a catalyst system in communication with said exhaust gas conduit, said catalyst system comprising:
      a substrate;
      a binder layer formed on the substrate; and
      a plurality of particulate catalyst structures affixed to a surface of said binder layer wherein:
      the binder layer is interposed between the substrate and the particulate catalyst structures;
      said plurality of particulate catalyst structures protrude from said surface of said binder layer such that at least about 70% of the surface area of said plurality of particulate catalyst structures is directly exposed to said stream of exhaust gases when said stream of exhaust gases passes over said catalyst system;
      said particulate catalyst structures have diameters of from about 5μ to 100μ and said particulate catalyst structures are arranged as a substantially uniform layer with adjacent particulate catalyst structures spaced apart from each other on said binder layer;
      said binder layer comprises a ceramic coating bound to said substrate, said binder layer having a thickness in the range of from about 0.5 to 10 microns;
      said binder layer being impervious to the exhaust gases so that the substrate is not in contact with the exhaust gases; and
      said particulate catalyst structures form a catalytic layer that does not contain components other than said particulate catalyst structures.

2. The exhaust system of claim 1;
   wherein said exhaust system comprises a catalytic converter in communication with said exhaust gas conduit, and said catalytic converter comprises said catalyst system; and.
   wherein the substrate is ceramic.

3. The exhaust system of claim 1, further comprising an exhaust manifold for receiving said stream of exhaust gases from said engine, said catalyst system comprising a catalytic laminate including said substrate, said binder layer and said plurality of particulate catalyst structures, and said catalytic laminate housed within said exhaust manifold; and wherein the substrate is stainless steel and the particulate catalyst structures are comprised of a material that is softer than stainless steel.

4. An air purification system for an interior space, comprising:

a source of an airstream;

a catalyst system in communication with said airstream, said catalyst system comprising a catalytic laminate including a substrate, a binder layer interposed between the substrate and a plurality of particulate catalyst structures disposed on said binder layer, wherein said plurality of catalyst structures protrude from said binder layer such that at least about 70% of the total surface area of said plurality of catalyst structures is directly exposed to said airstream when said airstream is passed over said catalytic laminate;

wherein said air purification system includes a heat exchanger, and said catalyst system is housed within said heat exchanger; and wherein said particulate catalyst structures are arranged as a substantially uniform layer with adjacent particulate catalyst structures spaced apart from each other on said binder layer so that heat transfer through the binder layer and the substrate is not impeded by the particulate catalyst structures;

wherein said binder layer comprises a ceramic coating bound to said substrate, said binder layer having a thickness in the range of from about 0.5 to 10 microns; and wherein said binder layer is impervious to the airstream so that the substrate is not exposed to oxidation by the airstream.

5. The air purification system of claim 4, wherein said plurality of particulate catalyst structures comprises a catalytically active material that is softer than the substrate.

6. The air purification system of claim 4, wherein said interior space is selected from the group consisting of a building interior and a vehicle interior.

* * * * *